United States Patent
Ho et al.

(10) Patent No.: US 6,419,829 B2
(45) Date of Patent: *Jul. 16, 2002

(54) MEMBRANE PROCESS FOR MAKING ENHANCED FLAVOR FLUIDS

(75) Inventors: Sa V. Ho, St. Louis; P. Wayne Sheridan, St. Charles, both of MO (US)

(73) Assignee: Spectrum Laboratories, Inc., Rancho Dominguez, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/736,339

(22) Filed: Dec. 15, 2000

Related U.S. Application Data

(63) Continuation of application No. 09/219,899, filed on Dec. 24, 1998, now Pat. No. 6,162,360, which is a continuation-in-part of application No. 08/999,127, filed on Dec. 29, 1997, now abandoned.

(51) Int. Cl.[7] .......................... B01D 61/36; B01D 61/00
(52) U.S. Cl. .................. 210/644; 210/644; 210/651; 210/653; 210/638; 210/643; 426/11; 426/14; 426/16; 426/425
(58) Field of Search ................. 210/640, 651, 210/638, 653, 644, 654, 643; 426/11, 14, 16, 425, 478, 452, 271, 792, 386

(56) References Cited

U.S. PATENT DOCUMENTS

| | | | |
|---|---|---|---|
| 3,426,754 A | 2/1969 | Bierenbaum et al. | 128/156 |
| 3,801,404 A | 4/1974 | Druin et al. | 156/229 |
| 3,802,444 A | 4/1974 | Pensabene | |
| 3,839,516 A | 10/1974 | Williams et al. | 264/41 |
| 3,843,761 A | 10/1974 | Bierenbaum et al. | 264/210 R |
| 3,843,762 A | 10/1974 | Sleigh | 264/213 |
| 3,920,785 A | 11/1975 | Druin et al. | 264/210 R |
| 4,055,696 A | 10/1977 | Kamada et al. | 428/398 |
| 4,255,376 A | 3/1981 | Soehngen et al. | 264/145 |
| 4,257,997 A | 3/1981 | Soehngen et al. | 264/145 |
| 4,359,510 A | 11/1982 | Taskier | 429/144 |
| 4,405,688 A | 9/1983 | Lowery et al. | 428/398 |
| 4,438,185 A | 3/1984 | Taskier | 429/250 |
| 4,778,688 A | 10/1988 | Matson | 426/425 |
| 4,816,407 A | 3/1989 | Matson | 435/287 |
| 5,013,447 A | 5/1991 | Lee et al. | 210/640 |
| 5,030,672 A | 7/1991 | Hann et al. | 524/109 |
| 5,143,526 A | 9/1992 | Lee et al. | 210/199.2 |
| 5,263,409 A | 11/1993 | van Eikeren et al. | 99/534 |
| 5,385,647 A | 1/1995 | Brueschke et al. | 203/39 |
| 5,507,949 A | 4/1996 | Ho | 210/490 |
| 5,512,180 A | 4/1996 | Ho | 210/643 |
| 5,552,053 A | 9/1996 | Ho et al. | 210/640 |
| 6,162,360 A | * 12/2000 | Ho et al. | |

FOREIGN PATENT DOCUMENTS

| | | |
|---|---|---|
| FR | 2716081 | 8/1995 |
| WO | WO 92/08783 | 5/1992 |

OTHER PUBLICATIONS

Secondini, Olindo, Handbook of Perfumes and Flavors, Chemical Publishing Co., Inc., New York, NY, p. 174.

R.W. Baker, Membrane Separation Systems—A Research and Development Needs Assessment, vol. II, Chapter 1, U.S. Dept. of Energy, Final Report; Mar., 1990.

D. Beaumelle et al., Pervaporation of Aroma Compounds in Water–Ethanol Mixtures: Experimental Analysis of Mass Transfer, Journal of Food Engineering, 16 (1992) 293–307.

Kirk–Othmer Encyclopedia of Chemical Technology, vol. 4, pp. 892–893 (1949).

* cited by examiner

Primary Examiner—Ana Fortuna
(74) Attorney, Agent, or Firm—Edgar W. Averill, Jr.

(57) ABSTRACT

A process using a hydrophobic membrane separation process for making an enhanced flavor fluid, particularly a low-alcohol brew, having improved flavor is disclosed.

5 Claims, No Drawings

MEMBRANE PROCESS FOR MAKING ENHANCED FLAVOR FLUIDS

This application is a continuation of U.S. patent application Ser. No. 09/219,899, filed Dec. 24, 1998, now U.S. Pat. No. 6,162,360, issued Dec. 19, 2000, which is a continuation-in-part of U.S. patent application Ser. No. 08/999,127, filed Dec. 29, 1997, abandoned.

BACKGROUND OF THE INVENTION

1. Field of the Invention

The present invention relates to an improved membrane separation process for making enhanced flavor fluids, and particularly, enhanced flavor low-alcohol brews.

ethanol from the beer without also extracting other low molecular weight flavor components. Table 1 lists the concentration, in parts-per-million (ppm), of selected compounds comprising the flavor components of commercially available beers: O'Doul's®, a commercially treated non-alcohol brew, Michelob Pale Ale®, a specialty, high-flavor beer, and Budweiser®, a regular, full-flavor, beer, each sold by the Anheuser-Bush Co., Inc., St. Louis, Mo., and non-alcohol brews Old Milwaukee®, sold by the Stroh Brewery Company, Detroit, Mich., Sharps®, sold by Miller Brewing Company, Milwaukee, Wis., and Coors®, sold by Coors Brewing Company, Golden, Colo. The non-alcohol brews lack, or contain very low concentrations of important beer flavor components, as compared to a high-flavor or full-flavor beer.

TABLE 1

| Compound (ppm) | O'Doul's ® | Michelob Pale Ale ® | Budweiser ® | Old Milwaukee ® NA | Sharps ® | Coors ® NA |
|---|---|---|---|---|---|---|
| ethyl acetate | 0.7 | 44.0 | 23.0 | — | — | 5.9 |
| isoamyl acetate | 0.1 | 3.2 | 2.1 | — | — | — |
| amyl alcohol | 8.6 | 78.0 | 71.0 | 7.8 | 4.6 | 5.0 |
| isobutyl alcohol | 1.4 | 34.0 | 10.0 | 2.1 | 2.05 | 1.9 |
| propanol | 1.3 | 38.0 | 14.0 | 1.3 | 1.1 | 16.3 |
| ethanol* | 0.3 | 5.2 | 5.1 | 0.4 | 0.36 | 0.48 |

*Ethanol concentration is % by volume
NA - Non-alcohol brew

2. Related Background Art

There is potentially a very large and profitable market for non-alcohol beer beverages, or non-alcohol brews. Most states define "beer" or "wine" as containing one-half of one percent or more of alcohol by volume. Accordingly, to qualify for the designation as "non-alcohol", the beverage must have an alcohol content of less than 0.5% by volume. Because of the very low alcohol content, "non-alcohol" beverages are not subject to an alcohol tax, yet can be sold at prices comparable to that of regular beers that have ethanol concentrations of about 3.0% to 5.0% by volume. Despite the potential growth market, current non-alcohol brews have not become popular because they lack the full flavor of regular beers.

The chemical composition of the flavor components of any given type of beer is very complex, and may include many chemical compounds. Sometimes, important flavor components are present in only trace amounts. However, the major flavor components, that is those contributing to the aroma and/or taste of beer, include alcohols and esters. Regular beers contain about 4% ethanol, by volume, and lower levels of higher alcohols, such as propanol and isobutyl alcohol. The major flavor components are esters, such as ethyl acetate, amyl acetate, phenyl acetate and the like.

Evaporation and dialysis are processes currently used to prepare non-alcohol brews. Both of these processes operate by removing the undesirable alcohol, ethanol, from regular beer. Unfortunately for consumers, these processes also remove key flavor components during the processing and produce non-alcohol brews with poor flavor profiles, that is taste and aroma profiles. The evaporation process either destroys or causes the loss of heat-labile and highly volatile flavor components. Dialysis is a membrane separation technique that is generally not selective enough to separate Membranes may be used to transport solubilized substances from a concentrated solution, often called a "feed" solution, through the membrane, to a fluid containing little or none of the substances. This fluid is often referred to as a "pick-up" fluid or permeate, because this fluid picks up the components from the feed solution by permeation through the membrane. The membranes may be used to selectively transport these substances from a feed solution to a pick-up fluid based on differences between the rate of transport of different substances across the membrane. Many different types of membrane separation systems are well known in the art and are described in *Membrane Separation Systems—A Research and Development Needs Assessment*, Vol. II, Chapt. 1, by R. W. Baker, prepared by the U.S. Department of Energy, Final Report: April, 1990.

Improved ethanol extraction membranes have been developed. For example, Maston, U.S. Pat. No. 4,816,407, discloses use of a semi-permeable membrane for extracting ethanol from an alcohol-containing composition. However, it would be useful to develop flavor component extracting processes to provide a flavor extract that could be used to reconstitute or enhance the flavor profile of the present non-alcohol brews.

The process of pervaporation has been applied to the extraction of aroma components in wine. D. Beaumelle, et al., *Journal of Food Engineering*, 16 (1992) 293–307. Pervaporation is a separation process used to fractionate liquid mixtures to transport organic aroma components through a membrane to a permeate followed by evaporation of the permeate and the recovery of the aroma faction. The recovered aroma fraction may be used to restore the flavor of non-alcohol wine. A major disadvantage of this process is the required evaporation of the permeate. The concentration of highly volatile aroma components in the aroma fraction may be reduced as a result of this treatment, thereby reducing the quality of the "aroma" added back to the non-alcohol wine.

Accordingly, it would be advantageous to develop a selective separation process that could provide enhanced separation between flavor components and alcohol and produce enhanced flavor fluids, particularly low-alcohol brews, having the complete spectrum of the taste and aroma components extracted in the separation process.

SUMMARY OF THE INVENTION

One aspect of this invention is a process for making an enhanced flavor fluid, particularly a low-alcohol brew, having an improved flavor profile, wherein a feed solution, containing the desired flavor components, such as a regular or specialty beer, is contacted with, or exposed to, a pick-up fluid, containing little or none of the desired flavor components, such as a low-alcohol brew, through a hydrophobic membrane. Flavor components are extracted from the feed solution into the pick-up fluid via the hydrophobic membrane to provide an enhanced flavor fluid having increased concentrations of flavor components. Hydrophobic membranes, useful in the process of this invention, include solid hydrophobic membranes and hydrophobic polymeric liquid membranes that can selectively transport flavor components of beer or other highly flavored fluids, without transporting significant amounts (reduce the concentration) of undesired components, e.g., ethanol. Particularly preferred hydrophobic polymeric liquid membranes include liquid polyglycol membranes. These membranes advantageously demonstrate high selectivity for the transport of flavor components over transport of ethanol and may be used to produce low-alcohol brews with enhanced flavor characteristics.

Another aspect of this invention is a process for making an enhanced flavor fluid, particularly a low-alcohol brew, having an improved flavor profile wherein a feed solution, containing the undesired flavor components, such as a commercially prepared low-alcohol brew, is contacted with, or exposed to, a pick-up fluid or gaseous stream, containing little or none of the undesired flavor components, through a hydrophobic membrane. Undesired flavor components are extracted from the feed solution into the pick-up fluid via the hydrophobic membrane to provide an enhanced flavor fluid having decreased concentrations of undesired flavor components.

Yet another aspect of this invention is directed to a recycle process for making an enhanced flavor fluid, wherein a first feed solution is extracted with a pick-up fluid to form an enhanced flavor fluid and an extracted feed solution. Optionally, this extracted solution may be treated to remove any undesired components. The resulting treated extracted feed solution may be used as a second pick-up fluid to extract flavor components from a second batch of feed solution to produce additional enhanced flavor pick-up fluid and additional extracted feed solution. Repetition of this cycle provides a continuous source of extracted feed solution and enhanced flavor pick-up fluid.

DETAILED DESCRIPTION OF THE INVENTION

According to the separation process of this invention, sufficient concentrations of flavor components, that is components contributing to aroma and/or taste, may selectively pass through a hydrophobic membrane from a feed solution, containing the desired flavor components, into a pick-up fluid, containing little or none of the desired flavor components. This process provides an enhanced flavor fluid having increased concentrations of flavor components. Specifically, this process may be used to provide an enhanced flavor low-alcohol brew having increased concentrations of beer flavor components and an alcohol concentration of less than 3.0%, and preferably less than 0.5% by volume. According to the process of the present invention, the hydrophobic membrane is positioned between the feed solution and the pick-up fluid. The feed solution, containing the desired flavor components, such as a regular beer or a specialty beer, contacts one side of the membrane and the pick-up fluid, containing little or none of the desired flavor components, such as a low-alcohol brew, contacts the other side of the membrane to accept the target components as they permeate through the hydrophobic membrane.

In another embodiment of this invention, sufficient amounts of undesirable flavor components may selectively pass through a hydrophobic membrane from a feed solution, containing an undesirable flavor component, into a pick-up fluid, containing little or none of the undesirable component. This process provides an enhanced flavor fluid having decreased concentrations of undesirable flavor components. Specifically, this process may be used to provide an enhanced flavor low-alcohol brew having decreased concentrations of "beanie" or "vegetative" off-flavors, with retained concentrations of desired flavor components and an alcohol concentration of less than 3.0%, and preferably less than 0.5% by volume. According to the process of this invention, a flavor fluid, such as a low-alcohol brew having undesirable flavor notes, contacts one side of a hydrophobic membrane and a pick-up fluid, composed of another fluid or a gaseous stream contacts the other side of the membrane to accept the target undesirable flavor components as they permeate through the hydrophobic membrane. Accordingly, an enhanced flavor fluid may be prepared by either increasing the concentration of desired flavor components or decreasing the concentration of undesired flavor components in a flavor fluid by appropriate selection of the feed solution and pick-up fluid.

Using a plate-and-frame configuration, a feed solution is exposed to or contacted with the pick-up fluid via a flat sheet membrane. In this configuration, the membrane sheet is located within a liquid tight housing, or cell, that divides the interior of the housing into at least two chambers, or compartments, i.e., a feed solution compartment and a pick-up fluid compartment. The housing is provided with inlet and outlet ports or manifolds which permit introduction and removal of the feed solution and the pick-up fluid, and is typically provided with a mechanism for stirring or agitating the liquids.

Using another configuration, exposure or contact between the feed solution and pick-up fluid may be accomplished by circulating the feed solution through the lumens of hollow fibers having microporous walls supported in a housing, the fiber walls constituting the hydrophobic membrane, and circulating the pick-up fluid over the outside of the fibers, also referred to as the shell side. Alternatively, the pick-up fluid may be circulated through the lumens and the feed solution circulated over the outside of the fibers (the shell side). The choice of the placement of the feed and pick-up fluids may be dependent upon operator preference. This use of the hollow fiber configuration provides very high surface area contact between the feed solution and pick-up fluid. The housing used with this configuration is also provided with inlet and outlet ports or manifolds which permit introduction and removal of the feed solution and the pick-up fluid.

Hydrophobic membranes useful in the present invention include both hydrophobic solid membranes, i.e. dense films, or supported hydrophobic solid membranes, and supported hydrophobic liquid membranes. As used herein, the term "supported membrane" refers to a non-rigid membrane-forming compound or composition that is supported or dispersed within a solid structure, typically a solid microporous material, i.e., a microporous support. The term "hydrophobic" describes a material that is substantially water insoluble and water immiscible. By "water insoluble" it is meant that the membrane is so sparingly soluble in an aqueous solution, with which it is in contact during use, that it remains in contact with the microporous support for an extended time without dissolving into the aqueous feed or pick-up solutions. In terms of the present invention and depending on the particular application, an extended time period can be from several hours to several weeks. Preferably, a hydrophobic material is soluble in an aqueous solution in an amount of less than about 50 ppm, more preferably less than about 30 ppm and most preferably less than about 10 ppm. The water solubility in the hydrophobic membranes useful in this invention should be less than about 10%, preferably less than about 5%, and generally it should be about 3% or lower.

Microporous supports useful for supporting the solid or liquid membranes in the present invention and their methods of preparation are well known in the art. Exemplary microporous supports may be found in U.S. Pat. No. 3,426,754; U.S. Pat. No. 3,801,404; U.S. Pat. No. 3,802,444; U.S. Pat. No. 3,839,516; U.S. Pat. No. 3,843,761; U.S. Pat. No. 3,843,762; U.S. Pat. No. 3,920,785; U.S. Pat. No. 4,055,696; U.S. Pat. No. 4,255,376; U.S. Pat. No. 4,257,997; U.S. Pat. No. 4,359,510; U.S. Pat. No. 4,405,688 and U.S. Pat. No. 4,438,185, the disclosures of which are hereby incorporated by reference. Generally, a hydrophobic microporous support is a material that is not spontaneously wet by water, having an open-celled, inter-connected structure. The microporous support should optionally be composed of material that is compatible with the hydrophobic solid or liquid polymer used therewith. Exemplary microporous support materials include polyolefins, polysulfones, polytetrafluoroethylenes, polycarbonates, polyether ketones, polystyrenes, and the like. The pore size of the support should be the smallest size to efficiently transport the target components, and the support should have the highest porosity and smallest thickness consistent with adequate mechanical integrity. The support may be in any configuration, such as a flat sheet or a spiral wound or a hollow fiber.

Microporous membranes meeting these descriptions are commercially available from several sources and are well known to those skilled in this art. In such materials, the micropores are interconnected through pathways which extend from one membrane surface or surface region to the other. The pores of commercially available microporous material fall predominantly in the range of about 0.02 to about 2 microns in effective diameter, although the size of individual pores often vary considerably from the noted average pore size. Pores as small as 0.01 micron and as large as 10 microns are not unusual, and a specific pore size is not critical. For example, microporous materials having an average pore size of about 0.1 micron provide stable liquid membranes using polypropylene glycol with a molecular weight of about 4000. Typically, commercial membrane support thicknesses range between 10 and 200 microns.

As noted above, the porosity must be sufficient to provide an open network through the support (open pore structure). Typically, commercially available microporous membrane supports will have a porosity of from about 30% to about 80%, with a more usual porosity for an isotropic membrane like the Celgard® membrane (see infra) being in the range of about 40% to about 50%. Porosity is defined as the fractional volume (expressed as a percent) of the membrane that is open rather than substrate material. Porosity can be assessed in an alternative fashion by reference to the material's bulk density. Suitable microporous materials will have a bulk density lower than the bulk density of the same polymeric material having no cellular structure. Bulk density refers to the weight of the material per unit of its gross volume, where gross volume is the volume of fluid displaced, where the fluid such as mercury, exhibits a surface tension that prevents it from flowing into the micropores of the material. See mercury volumenometer method in *Kirk-Othmer Encyclopedia of Chemical Technology*, Vol. 4, page 892 (1949).

While the porosity of the support often times will be uniform across its cross-section, in an alternative embodiment, the hydrophobic microporous support may have an asymmetric porosity. For example, the surface region of the support may have smaller pores and/or a lower porosity than the major matrix region, whose more open porosity facilitates transport of the target component. Such a construction may provide higher transfer rates relative to use of uniform porosity membrane supports. An asymmetric polysulfone membrane meeting such a construction is disclosed in U.S. Pat. No. 5,030,672, the disclosure of which is incorporated by reference.

Preferred microporous supports useful in the present invention include hydrophobic microporous films, such as the CELGARD® and Liqui-Cel® Extraflow polypropylene membrane materials available from Hoechst Celanese Separations Products Division, Hoechst Celanese Corporations, South Point, N.C., perfluorocarbon polymers, particularly of the type designated Gortex®, a trademark of W. L. Gore & Associates, Inc., Newark, Del., and polypropylene hollow fibers available from Akzo N. V. under the Accurel™ and Liqui-Cel® label.

Hydrophobic solid membranes useful in the present invention are described in U.S. Pat. No. 5,552,053, the disclosure of which is incorporated herein, by reference and include solid silicone membranes such as siloxane polymers available from Sigma Chemical Co., St. Louis, Mo., and polydimethylsiloxane elastomer membranes available from Membrane Products Corp., Salt Lake City, Utah. The hydrophobic solid membrane may be a continuous film that is strengthened sufficiently by cross-linking to be used alone, supported on a frame or overlaid, and/or cast on a microporous support. Alternatively, the hydrophobic membranes may reside within the pores of a microporous support. If the solid polymer is a continuous film itself, it contains no pores. Further, it is understood that if the solid polymer either overlays or is cast on the microporous support or is within the pores of the microporous support, the pores of the support or membrane lead from one surface of the support or membrane to the other.

There are a wide variety of known hydrophobic polymeric solids that may be used in preparing the solid membrane of the present invention. Either natural or synthetic hydrophobic, polymeric solids may be used. Representative polymeric solids useful in the present invention are polyalkylene oxides, particularly polypropylene glycols, polytetramethylene glycols, polyhexamethylene glycols, polyhexamethylene glycols and polyheptamethylene glycols, polyesters, polyureas, polyurethanes, silicones, and the like. For example, a polydimethylsiloxane membrane is useful to selectively transport higher ($C_4$–$C_5$) alcohol and ester compounds over ethanol. Solid polymers, may be made into a continuous film or polymerized in or compressed into the pores of a microporous membrane. Such solid polymers are safe to handle and highly resistant to mechanical loss from the hydrophobic microporous support.

A supported hydrophobic solid membrane useful in this invention may be prepared, for example, by either forming a thin selective separation film on a porous support or filling the pores of a support with a polymerizable compound that may be polymerized in the support, thereby forming the solid membrane.

The supported hydrophobic liquid membranes, useful in the process of this invention are composed of a microporous support having a water insoluble hydrophobic liquid immobilized within the pores of the microporous structure. The pores of the microporous membrane support should be sized so as to retain the oligomeric and polymeric liquid within the pores of the support by capillary action. With a proper combination of pore size and porosity, loading of the liquid oligomer or polymer into the porous matrix is easily accomplished, but capillary forces remain sufficiently strong to resist expulsion of the oligomer or polymer liquid from the support during use of the liquid membrane.

The hydrophobic liquid polymers useful in this invention may be any water-insoluble, water-immiscible liquids having high affinity for organic compounds. The liquid polymers useful in the present invention may be relatively low molecular weight hydrocarbons, i.e. hexadecane, to high molecular weight oligomeric or polymeric liquid compounds.

Exemplary supported polymeric hydrophobic liquid membranes, useful in the process of this invention, are described in U.S. Pat. No. 5,507,949, the disclosure of which is incorporated herein, by reference. Many of the useful hydrophobic liquid oligomers and polymers may be described as poly(amphiphilic) compounds. The term poly (amphiphilic) compound refers to a class of oligomers or polymers having alternating polar regions and hydrophobic regions. These regions of polarity and hydrophobicity typically alternate along the oligomer or polymer backbone in such a manner that the molecule has a high density of both polar and hydrophobic moieties. Either natural or synthetic hydrophobic, oligomeric and polymeric liquids may be used to prepare the hydrophobic liquid membrane used in the process of this invention. Exemplary hydrophobic liquid polymers include polyalkylene oxides, particularly polypropylene glycols, polybutylene glycols, polytetramethylene glycols, polypentamethylene glycols, polyhexamethylene glycols and polyheptamethylene glycols, polyesters, polyureas, polyurethanes, silicone oils, paraffin oils (saturated hydrocarbons) functionalized polyolefins, and the like. Polyalkylene oxides are particularly preferred hydrophobic liquid polymers.

Preferred supported hydrophobic liquid membranes, useful in the process of this invention, include polypropylene glycols, polybutylene glycols, hexadecane, dodecane, paraffin oils, silicone oils and the like. Advantageously, selection of a particular hydrophobic liquid membrane may be used to selectively produce enhanced flavor fluids, such as low-alcohol brews, having different flavor characteristics, wherein the concentration of different flavor components are selectively increased. For example, polybutylene glycol liquid membranes show very high selectivity for the transport of ester compounds and $C_5$ alcohols over lower $C_2$–$C_4$ alcohols. In contrast, polypropylene glycol and silicone membranes show almost equal selectivity for transport of $C_4$–$C_5$ alcohols and ester compounds. Hexadecane membranes selectively transport amyl and isobutyl alcohols over ethanol and esters, ethyl acetate and isoamyl acetate. These membranes may also be useful for removing undesirable flavor components present in low-alcohol brews, such as beanie or bitter off-flavors, which may be due to the presence of compounds such as 2-pentyl pyridine, 2-pentenal, ethyl vinyl ketone, 1-octen-3-ol, and the like. Although any of the preferred supported membranes described above may be useful for removing undesired flavors by the extraction method of this invention, it has been found that polybutylene glycol membranes are more efficient than silicone oil membranes at removing beanie off-notes. Thus, these hydrophobic membranes may be used to produce beverages, and particularly low-alcohol brews, possessing enhanced, yet varied, flavor characteristics.

The supported liquid polymeric membrane used in this invention may be prepared, for example, by wetting a flat sheet of microporous polypropylene (Celgard 2500, 45% porosity, 0.75 micron average pore size, 25±2.5 microns thick, manufactured by Hoechst Celanese Corp., Charlotte, N.C.) with a few drops of a suitable hydrophobic liquid polymer and spreading the polymer over the surface of the sheet. Excess polymer may be wiped off the membrane with an absorbent material. Alternatively, the hydrophobic liquid polymer may be immobilized in lumens of hollow fibers by pouring or pumping a polymer, that optionally may be heated to about 60° C., into the lumen side of a vertically oriented Liqui-Cel® Extra-Flow. Membrane Contactor module (Hoechst Celanese Corp., Charlotte, N.C.). The polymer is allowed to flow through hollow fibers. Excess polymer is collected as it drips out of the coated lumens. Nitrogen may then be passed through the lumen side to force out the residual polymer.

In one embodiment of this invention, wherein the enhanced flavor fluid contains an increased concentration of desired flavor components, the feed solution is the source of the flavor components. Accordingly, the feed solution used to prepare an enhanced flavor low-alcohol brew, may be any full flavor beer containing high concentrations of the desired flavor components.. Full flavor beers include any commercial-grade regular beer, ale, lager or the like, and preferably, any specialty beer. As used herein, a "regular" beer is a commercial-grade beer typically light in color, containing approximately 5% alcohol by volume, and possessing full beer flavor. "Regular" beers are exemplified by beers sold under the following brand names: Budweiser®, Miller®, Miller Light®, Pabst Blue Ribbon®, Rolling Rock®, and the like. A wide variety of regular beers, ales, and lagers are commercially available, each possessing common taste and aroma components, but in varying concentrations. As used herein, a "specialty" beer is a beer that possesses a richer beer flavor than a "regular" beer, i.e., a beer that contains higher concentrations of the desirable flavor components. A wide variety of specialty beers are available from large scale commercial breweries as well as smaller scale micro-breweries, each possessing common taste and aroma components, but in varying concentrations. The concentrations of flavor components vary not only from beer to beer, or ale to beer, but may also vary from batch to batch, depending upon differences in the ingredients used to prepare the beer as well as variations in the brewing process. For example, the concentrations of the flavor components in the beer feed solutions used herein are slightly different from sample to sample. Generally, however, most regular beers will have isobutyl alcohol concentrations in the range of about 10 to about 25 ppm and propanol concentrations in the range of about 10 to about 30 ppm. Specialty beers, however, will typically contain these components in concentrations that are approximately 5–20 ppm higher than in regular beers. "Specialty" beers are exemplified by beers sold under the following brand names: Michelob Pale Ale®, Red Dog Beer®, Anchor Steam®, Samuel Adams®, and the like.

It is understood that each of the regular and specialty beers, as exemplified above, possesses different flavor profiles. Accordingly, use of different beers, or a combination of beers, as the feed beer will produce different enhanced flavor brews, each having different flavor profiles. It is considered to be within the ordinary skill of one in the art to select a beer, or combination of beers, to produce an enhanced flavor brew possessing desired flavor characteristics, using the method of this invention.

In the same embodiment of this invention, wherein the enhanced flavor fluid contains an increased concentration of desired flavor components, the pick-up fluid is a fluid that contains lower concentrations of flavor components than a full flavored feed solution and is a fluid in which these components are soluble. Generally, the concentration ratio of the flavor components in the initial feed solution to the flavor components in the initial pick-up fluid is greater than 1:1. The preferred pick-up fluid used in this embodiment of the invention is a commercially produced non-alcohol brew, or other low-alcohol brew, lacking or having very low concentrations of beer flavor components. Typically such a low-alcohol brew has been subjected to a treatment that has reduced the content of the flavor components of the beer. Exemplary treated brew pick-up fluids include evaporated non-alcohol brew, dialysis-treated non-alcohol brew, and the like.

In another embodiment of this invention, wherein the enhanced flavor fluid contains a decreased concentration of undesired flavor components, the feed solution is the source of the undesired flavor components. Accordingly, the feed solution used to prepare an enhanced flavor low-alcohol brew, may be any low-alcohol brew, either an enhanced flavor low-alcohol brew prepared as described above, or may be any commercially available low-alcohol brews, exemplified above, containing detectable concentrations of the undesired flavor components. The undesired flavor components may be present only in trace amounts, such that they may not be detectable by analytical techniques, but may be detectable by olfactory senses (taste or smell of the fluid). Advantageously, the method of this invention may be used to remove, or substantially remove, such trace amounts of undesired flavor components that adversely effect the taste profile of the low-alcohol brew to provide low-alcohol brews having significantly enhanced flavor. In this embodiment of the invention, wherein the enhanced flavor fluid contains a decreased concentration of undesired flavor components, the pick-up fluid is a fluid or gaseous stream that contains none or only a low concentration of the undesired flavor component(s) and is a fluid or gas into which these components may be absorbed. Generally, the concentration ratio of the flavor components in the initial feed solution to the flavor components in the initial pick-up fluid is greater than 1:1. The preferred pick-up "fluid" used in this embodiment of the invention may be a fluid or a gas in which the undesirable flavor component may be preferentially adsorbed or solubilized, compared to the desired flavor components. Exemplary pick-up fluids include water, carbonated water, ethylene glycol, and polyglycols (polyethylene glycol, polypropylene glycol, polybutylene glycol, and the like), and exemplary pick-up gases include carbon dioxide, nitrogen and the like.

As stated above, a beverage, in order to be designated "non-alcoholic" must have less than 0.5% by volume of ethanol. A "detrimental amount of alcohol" as used herein is intended to mean a 0.5% or higher concentration of ethanol.

Extraction of the flavor components from any of the above-described feed solutions may be conducted in a batch mode by exposing a selected pick-up fluid to a single batch of feed solution. Alternatively, extractions may be conducted in a simulated continuous mode by changing the feed solution periodically in the cell. Membrane composition, contact time, temperature, and relative flow rates of the feed solution and pick-up fluid are some of the parameters that may be modified to change the extraction rate or the selectivity of the extraction or separation of the flavor components from the feed solution. Accordingly, adjusting these parameters will vary the flavor profile of the resulting enhanced flavor fluids. It is understood that such adjustment is readily performed by one of ordinary skill in the art.

Another embodiment of this invention is a recycle process for an enhanced flavor fluid having increased concentrations of desired flavor components, wherein a first batch of a full flavor feed solution, containing desired flavor components, is placed in contact with a surface of a hydrophobic membrane, which membrane is also in contact with a pick-up fluid containing comparatively lower concentrations of these flavor components. Optionally, this pick-up fluid may have been treated to remove or substantially remove any undesirable components, as described above. The flavor components are extracted from the feed solution into the pick-up fluid to form an enhanced flavor fluid and an extracted feed solution. This extracted feed solution contains reduced levels of the flavor components, but may also contain high concentrations of undesired components. Accordingly, this extracted feed solution may be treated to remove or substantially remove the undesired component, thereby forming a treated extracted feed solution. This solution may then be recycled and used as the pick-up fluid in an additional extraction process. Accordingly, a second batch of a full flavor feed solution containing flavor components may be placed in contact with a surface of a hydrophobic membrane, which membrane is also in contact with the second pick-up fluid composed of the treated extracted feed solution. Extracting the flavor components from this second feed solution into the second pick-up fluid (the treated extracted feed solution) will provide a fluid having the undesired component removed or substantially removed therefrom but having enhanced flavor and a second batch of an extracted feed solution. Accordingly, this process may be repeated to provide a continuous source of extracted feed solution and enhanced flavor fluid having an undesired component removed or substantially removed therefrom.

Specifically, this recycle method may be used to make enhanced flavor low-alcohol brew, wherein the extracted feed solution, e.g., the feed beer that results after contact and extraction with a pick-up fluid, may be used as the pick-up fluid for a-fresh batch of feed solution, e.g., full flavor or enhanced flavor beer. The extracted feed beer contains reduced levels of flavor components, but still contains a normal, and undesirably high, alcohol content (approximately 4–5% by volume) or undesirable flavor component(s). Accordingly, the extracted beer may be subjected to a treatment, such as evaporation or dialysis, to remove or substantially remove the alcohol, and may optionally be used as a feed solution in a second membrane extraction process to remove or substantially remove undesirable flavor component(s) to form a treated low-alcohol brew. This treated low-alcohol brew may then be used as the pick-up fluid for another fresh feed solution of full flavor beer providing additional enhanced flavor low-alcohol brew and extracted beer. This process may be repeated to thereby provide a continuous source of extracted beer for conversion to enhanced flavor low-alcohol brew. The recycling process may be conducted in a batch mode or in a continuous mode, as described above.

Experimental Procedures

Two sizes of cells were used for the laboratory scale experiments. The "normal" size cell can contain approximately 30 ml of fluid in each cell compartment. The "10×" size cell can contain approximately 500 ml of fluid in one compartment and approximately 230 ml of fluid in the opposing compartment. The feed solution is generally placed in the larger (500 ml) compartment. Batch mode extractions were conducted by exposing a pick-up fluid to a single batch of feed solution for approximately 24 hours. Simulated continuous mode extractions were conducted by changing the batch of feed solution in the cell periodically, typically at 3 to 8 hour intervals. The exposure/extraction time of any batch of feed solution may be lengthened or shortened to obtain a desired concentration of the flavor components. The surface area of the membrane between the compartments and in contact with the fluids is 8 cm$^2$ for the normal size cell and 44.2 cm$^2$ for the 10× cell. It is understood that the size and/or configuration of the laboratory extraction cells, used herein, is not intended to limit the size and/or configuration of the extraction apparatus for large scale separations, employing gallons of feed solution. Budweiser®, Michelob Light®, and Michelob Pale Ale®, all commercial grade beers, were used as feed solutions. Budweiser® is a beer having the alcohol, flavor and calorie content of a regular U.S. commercial beer. Michelob Light® has similar alcohol content but a reduced caloric content. Michelob Pale Ale® has normal alcohol content but has higher concentrations of flavor components than typical beers.

The Examples which follow are intended as an illustration of certain preferred embodiments of the invention, and no limitation of the invention is implied.

EXAMPLE 1

Hydrophobic liquid membranes, containing the liquid polymers polypropylene glycol (PPG, Mol. Wt. 4000), polybutylene glycol (PBG, Mol. Wt. 4800) and silicone (polydimethylsiloxane, Mol. Wt. 12500), were prepared by separately treating flat sheets of Celgard® 2500 polypropylene microporous membrane with one of the polymeric liquids. Each liquid hydrocarbon was introduced into the pores of a Celgard® 2500 membrane by wetting the sheet with drops of the liquid. Excess liquid was wiped off with a tissue. The Michelob Light® beer, a beer having the alcohol and flavor components of a regular U.S. commercial beer, but with reduced calorie content, available from Anheuser-Bush Co., Inc., St. Louis, Mo., was used as the feed solution. HPLC grade water, was used as the pick-up fluid. These flavor components were undetectable in the HPLC grade water. Extractions were conducted at room temperature in batch mode using flat sheet membranes in normal size cells. Liquids in each of the cell compartments were magnetically stirred. The extractions were conducted at room temperature for about 24 hours. The concentrations of the representative flavor components, e.g., $C_2$ to $C_5$ alcohols and esters, ethyl acetate and amyl acetate, in the feed solution and pick-up fluid were determined by gas chromatographic analysis using a 25 m×0.53 mm LD CP-Wax 52 fused silica column. (Chrompack, Inc., The Netherlands).

Table 2 shows the ratio of the concentration of the flavor component in the pick-up fluid to its concentration in the feed after a 24 hour exposure/contact. A value of 1 indicates that equilibrium was reached, i.e., the pick-up and feed contained equal concentrations of a component. A low ratio indicates a slow rate of transport of the component across the membrane.

TABLE 2

| | Pick-up/Feed Ratio | | |
|---|---|---|---|
| Component | PPG* | PBG** | Silicone |
| ethyl acetate | 1.1 | 1.1 | 1.1 |
| isoamyl acetate | 1.1 | 1.1 | 1.1 |
| amyl alcohols | 1.0 | 0.8 | 1.0 |
| isobutyl alcohols | 0.8 | 0.3 | 0.7 |
| propanol | 0.6 | 0.2 | 0.5 |
| ethanol | 0.3 | 0.1 | 0.2 |

*PPG - polypropylene glycol
**PBG - polybutylene glycol

The esters, ethyl acetate and isoamyl acetate, permeate through each of these membranes, reaching equilibrium concentrations in less than 24 hrs of exposure. Polyglycol and silicone liquid membranes permit amyl alcohol and isobutyl alcohol to reach near equilibrium concentrations after 24 hour exposure, whereas only low concentrations of ethanol can be detected. Thus, these hydrophobic membranes can be used to selectively transport high concentrations of flavor components of beer without transporting significant concentrations of ethanol.

EXAMPLE 2

Stirred solutions of Michelob Light® beer (feed solution) and HPLC grade water (pick-up fluid) were contacted through a polybutylene glycol-4800/Celgard® 2500 liquid membrane, prepared as described above, at room temperature. Using laboratory scale normal size cells, a continuous mode process was simulated by replacing exposed feed, Michelob Light® beer, with fresh beer at intervals of 6.0, 6.0, 4.8, 8.0 and 2.3 hours, for a total exposure time of 27 hours. Table 3 shows the compositions for the initial Michelob Light® beer and the resulting pick-up fluid, or the enhanced flavor pick-up fluid, after the five feed changes, noted above. Use of a simulated continuous mode extraction process produced a low-alcohol pick-up fluid containing beer flavor components at concentrations nearly 70–90% of a full-flavor beer, yet containing less than 10% of the ethanol present in a full-flavor beer.

TABLE 3

| Component | Michelob Light ® (Feed, ppm) | Final Pick-up Fluid (Pick-up, ppm) |
|---|---|---|
| ethyl acetate | 16 | 13 |
| isoamyl acetate | 1.4 | 1.2 |
| amyl alcohols | 59 | 39 |
| isobutyl alcohol | 8.5 | 2.7 |
| propanol | 13 | 2 |
| ethanol (vol %) | 3.4 | 0.3 |

EXAMPLE 3

Two extraction cells were prepared having Michelob Light® beer, as the feed solution, and HPLC grade water, as the pick-up fluid, and contacted through a polybutylene glycol-4800/Celgard® 2500 liquid membrane, prepared as described above, for a period of 24 hours. The extractions for each cell were independently conducted at temperatures of 21° C. and 4° C. Table 4 shows the pick-up/feed ratios of the representative components at 21° C. and 4° C. A value of 1 indicates that equilibrium was reached.

TABLE 4

| | Pick-up/Feed Ratio | |
|---|---|---|
| Component | 21° C. | 4° C. |
| ethyl acetate | 1.1 | 0.6 |
| isoamyl acetate | 1.1 | 1.3 |
| amyl alcohols | 0.8 | 0.3 |
| isobutyl alcohol | 0.3 | 0.1 |
| propanol | 0.2 | 0.03 |
| ethanol | 0.1 | 0.01 |

The ratio of ethyl acetate to ethanol pick-up/feed ratios increased significantly from 11 at 21° C. to 60 at 4° C. after 24 hour exposure. Accordingly, the use of lower temperatures reduced the rate of transport of components across the membrane and enhanced the separation selectivity between alcohol and ester compounds.

EXAMPLE 4

Extractions were conducted for differing time periods using Michelob Light® beer (feed), HPLC grade water (pick-up) and a PBG-4800/Celgard® 2500 membrane. As indicated in Table 5, isoamyl acetate, ethyl acetate and amyl alcohol reach equilibrium or near equilibrium concentrations after a 5 hour exposure period, whereas only low concentrations of ethanol were extracted by the pick-up fluid.

TABLE 5

| | Pick-up/Feed Ratio | |
|---|---|---|
| Component | 5 Hour Exposure | 21 Hour Exposure |
| ethyl acetate | 0.7 | 1.1 |
| isoamyl acetate | 1.1 | 1.1 |
| amyl alcohols | 0.8 | 1.0 |
| isobutyl alcohol | 0.3 | 0.8 |
| propanol | 0.2 | 0.6 |
| ethanol | 0.1 | 0.3 |

The length of time the feed solutions and pick-up fluids are exposed, or placed in contact with the liquid membrane effects the amount of flavor components that are transported from the feed to the pick-up fluid. Use of shorter exposure/contact times reduces the concentration of some of the components in the pick-up, but also provides enhanced separation selectivity between alcohol and ester compounds.

EXAMPLE 5

The hydrophobic membrane was prepared by treating a flat sheet of Celgard® 2500 polypropylene microporous membrane with hexadecane (sold by Burdick and Jackson, Muskegon, Mich.). The liquid hydrocarbon was introduced into the pores of the membranes by wetting the sheet with drops of the liquid. Excess liquid was wiped off with a tissue. This process was repeated two times. Extractions were conducted at room temperature in batch mode using flat sheet membranes in normal size cells. The feed solution used in this example, was a specialty beer, Michelob Pale Ale®, which has a higher concentration of flavor components than regular beer, i.e., Michelob Light® beer. HPLC grade water was used as the pick-up fluid. The liquids (approximately 30 ml) in each of the cell compartments were magnetically stirred, and extraction was conducted at room temperature for 20.3 hours.

Table 6 shows the ratio of the concentration of the flavor components in the final pick-up fluid relative to the concentration of these components in the final feed solution, after a 24 hour exposure/contact. A value of 1 indicates that equilibrium was reached, i.e., the pick-up and feed contained equal concentrations of a component. A low ratio indicates a slow rate of transport of the component across the membrane.

TABLE 7

| Component | Pale Ale ® (Initial Feed, ppm) | Pale Ale ® (Final Feed, ppm) | Final Pickup Solution (ppm) | Final Pick-up/Feed Ratio |
|---|---|---|---|---|
| ethyl acetate | 20.1 | 15.9 | 9.5 | .6 |
| isoamyl acetate | 1.77 | 2.0 | .87 | .4 |
| amyl alcohols | 74.6 | 41.8 | 30.8 | .7 |
| isobutyl alcohol | 31.6 | 19.2 | 13.6 | .7 |
| propanol | 45.8 | 31.7 | 9.9 | .3 |
| ethanol (vol %) | 5.2 | 4.36 | 0.54 | .14 |

EXAMPLE 6

Michelob Pale Ale®, a specialty beer (feed solution) was contacted with commercial grade O'Doul's® brew (pick-up fluid) through a PBG-4800/Celgard® 2500 liquid polymer membrane, prepared as described above.

Extraction was performed in batch mode for a period of 24 hours at room temperature, using a normal size laboratory scale extraction cell equipped with magnetic stirring. Table 8 shows the concentrations, in ppm, of the flavor components found in the initial Michelob Pale Ale® and in the resulting pick-up fluid (hereinafter referred to as the "flavored pick-up" or the "enhanced flavor O'Doul's® brew"). The enhanced flavor O'Doul's® brew contains 4–7 times the concentration of higher alcohols and over 20 times the concentration of esters than the original O'Doul's® brew. Moreover, the enhanced flavor O'Doul's® brew has a flavor component composition very similar to regular beer, such as Budweiser®, but has a significantly lower concentration of ethanol.

TABLE 8

| Component | Initial Pale Ale ® (ppm) | Initial O'Doul's ® (ppm) | Final O'Doul's ® (ppm) | Budweiser ® (ppm) |
|---|---|---|---|---|
| ethyl acetate | 44.0 | 0.7 | 17.0 | 23.0 |
| isoamyl acetate | 3.2 | 0.1 | 2.2 | 2.1 |
| amyl alcohols | 78.0 | 8.6 | 39.0 | 71.0 |
| isobutyl alcohol | 34.0 | 1.4 | 10.0 | 10.0 |

TABLE 8-continued

| Component | Initial Pale Ale ® (ppm) | Initial O'Doul's ® (ppm) | Final O'Doul's ® (ppm) | Budweiser ® (ppm) |
|---|---|---|---|---|
| propanol | 38.0 | 1.3 | 7.0 | 14.0 |
| ethanol* | 5.2 | 0.38 | 0.76 | 5.1 |

*Ethanol concentration is % by volume.

EXAMPLE 7

The process of Example 6 was repeated, except that the extraction was performed for a period of 21 hours at 4° C., using a 10× size laboratory scale extraction cell, equipped with magnetic stirring. Table 9 shows the concentrations, in ppm, of the flavor components found in the initial Michelob Pale Ale® and in the resulting enhanced flavor O'Doul's® brew. The enhanced flavor O'Doul's® brew contains 2–3 times the concentration of higher alcohols and 16–20 times the concentration of esters than the original O'Doul's® brew.

TABLE 9

| Component | Initial Pale Ale ® (ppm) | Initial O'Doul's ® (ppm) | Final O'Doul's ® (ppm) | Budweiser ® (ppm) |
|---|---|---|---|---|
| ethyl acetate | 44.0 | 0.7 | 15.0 | 23.0 |
| isoamyl acetate | 3.2 | 0.1 | 1.6 | 2.1 |
| amyl alcohols | 78.0 | 8.6 | 24.0 | 71.0 |
| isobutyl alcohol | 34.0 | 1.4 | 3.7 | 10.0 |
| propanol | 38.0 | 1.3 | 2.9 | 14.0 |
| ethanol* | 5.2 | 0.38 | 0.5 | 5.1 |

*Ethanol concentration is % by volume.

EXAMPLE 8

Miller High Life® (MHL), a beer having the alcohol and flavor components of a regular U.S. commercial beer (feed solution), was contacted with HPLC grade water (pick-up fluid) through a PBG-4800/Celgard® 2500 liquid polymer membrane, prepared as described above. Extraction was performed in batch mode for a period of 24 hours at room temperature, using a normal size laboratory scale extraction cell equipped with magnetic stirring. Table 10 shows the concentrations, in ppm, of the flavor components found in the initial Miller High Life® and in the resulting pick-up fluid.

TABLE 10

| Component | MHL (Initial Feed, ppm) | MHL (Final Feed, ppm) | Final Pickup Solution (ppm) | Final Pick-up/ Feed Ratio |
|---|---|---|---|---|
| ethyl acetate | 41.2 | 17.3 | 10.5 | .61 |
| isoamyl acetate | 2.7 | 1.2 | 0.8 | .67 |
| amyl alcohols | 79 | 42.9 | 20.9 | .49 |
| isobutyl alcohol | 20 | 13.5 | 3.6 | .27 |
| propanol | 24 | 13.3 | 1.1 | 0.08 |
| ethanol (vol %) | 4.43 | 4.36 | 0.19 | 0.04 |

EXAMPLE 9

Michelob Pale Ale®, a specialty beer (feed solution) was contacted with HPLC grade water (pick-up fluid) through a polydimethylsiloxane elastomer membrane (MEM-100, Membrane products Corp., Utah), an un-coated solid siloxane elastomer flat sheet membrane, supplied in 8.5×11 inch sheets, 3 mil (75 micron) thick. This sheet was cut to obtain a standard size sheet to fit the normal size extraction cell, having a membrane surface area of 8 cm$^2$. Extraction was performed in batch mode for a period of 24 hours at room temperature, using a normal size laboratory scale extraction cell equipped with magnetic stirring. Table 11 shows the concentrations, in ppm, of the flavor components found in the initial Michelob Pale Ale® and in the resulting pick-up fluid.

TABLE 11

| Component | Pale Ale ® (Initial Feed, ppm) | Pale Ale ® (Final Feed, ppm) | Final Pickup Solution (ppm) | Final Pick-up/ Feed Ratio |
|---|---|---|---|---|
| ethyl acetate | 47.9 | 17.6 | 15.8 | 0.90 |
| isoamyl acetate | 3.8 | 0.73 | 0.80 | 1.1 |
| amyl alcohols | 89.0 | 45.2 | 37.8 | 0.84 |
| isobutyl alcohol | 38.9 | 22.9 | 15.0 | 0.66 |
| propanol | 52.3 | 36.4 | 11.1 | 0.30 |
| ethanol (vol %) | 5.2 | 4.05 | 0.68 | 0.17 |

EXAMPLE 10

Michelob Pale Ale®, a specialty beer (feed solution) was contacted with commercial O'Doul's® beer (pick-up fluid) in a hollow fiber module. This configuration provides for exposure or contact between the feed solution and the pick-up fluid by circulating the feed solution through the lumens of hollow fibers having microporous walls supported in a housing, the fiber walls constituting the liquid polymer membrane, and circulating the pick-up fluid over the outside of the fibers. This configuration provides very high surface area contact between the feed solution and the pick-up fluid. The supported liquid polymeric membrane, used herein, was prepared by pouring heated (60° C.) polybutylene glycol (Mol. Wt. 4800) into the lumen side of a vertically oriented Liqui-Cel® Extra-Flow Membrane Contactor module (Hoechst Celanese Corp., Charlotte, N.C.). The polymer was allowed to drip out by gravity overnight. Nitrogen was then passed through the lumen side for 2 hours to force out the residual polymer. The cell reservoirs, equipped with magnetic stirrers, were connected to the hollow fiber module with Teflon flexible tubing. The tubing passed through a 4 inch diameter rubber stopper sealing the reservoirs.

Table 12 presents the results of the extraction, conducted for 24 hours, in batch mode and at 4° C., using approximately 2.1 liters each of the feed and pick-up fluids. Membrane area in contact with the liquids was 14,000 cm$^2$.

TABLE 12

| Component | Pale Ale ® (Initial Feed, ppm) | Pale Ale ® (Final Feed, ppm) | Initial O'Doul's ® (Initial Pick-up, ppm) | Final O'Doul's ® (Final Pick-up, ppm) | Final Pick-up/ Feed Ratio |
|---|---|---|---|---|---|
| ethyl acetate | 23 | 9.8 | — | 10 | 1.0 |
| isoamyl acetate | 2 | 0.5 | — | 0.6 | 1.2 |
| amyl alcohols | 101 | 54 | 7.5 | 50 | 0.93 |

TABLE 12-continued

| Component | Pale Ale ® (Initial Feed, ppm) | Pale Ale ® (Final Feed, ppm) | Initial O'Doul's ® (Initial Pick-up, ppm) | Final O'Doul's ® (Final Pick-up, ppm) | Final Pick-up/ Feed Ratio |
|---|---|---|---|---|---|
| isobutyl alcohol | 42 | 27 | 2.8 | 15 | 0.56 |
| propanol | 41 | 29 | 2.1 | 8.7 | 0.30 |
| ethanol (vol %) | 5.24 | 4.3 | 0.51 | 0.92 | 0.22 |

EXAMPLE 11

O'Doul's® beer (commercial sample, feed solution), having a beanie off-flavor, was contacted with carbonated water (feed solution), in a cold room at a temperature of about 40 to 50 F., using a Liquid-Cel® Extra-Flow membrane module (available from Hoechst-Celanese Corp., Charlotte, N.C.) having a 4" diameter and length of 28", containing hollow fibers with a total membrane area of 19.2 m². The supported liquid membrane of the membrane module was prepared by impregnating the hollow fiber membranes with polybutylene glycol (Mol. Wt. 4800). The feed solution, O'Doul's® low-alcohol-brew (about 16 liters), was pumped in a single pass continuously through the lumen side of the module at a flowrate of 300 ml/min and the effluent collected in a stainless steel tank. The pick-up fluid, de-aerated water (about 16 liters), was circulated through the shell side of the module at about 6 liter/min. The resulting treated feed solution was pressurized to about 20 psi with carbon dioxide (for carbonation before being bottled, capped and pasteurized. A tasting panel found that the beanie note was no longer present in the treated O'Doul's® and, as a result, this treated beer tasted significantly better than the original O'Doul's®.

EXAMPLE 12

Example 11, was repeated, except that the feed solution was pumped through the shell side of the module at a flowrate of about 500 ml/min. Carbonated water was used as the pick-up fluid and was circulated through the lumen side of the module at a rate of 3 liters/min. A tasting panel found no beanie note present in the treated O'Doul's®.

EXAMPLE 13

Example 12, was repeated, except that the feed solution was pumped through the shell side of the module at a flowrate of about 1000 ml/min. Carbonated water was used as the pick-up fluid and was circulated through the lumen side of the module at a rate of 3 liters/min. A tasting panel found the treated O'Doul's® produced according to this procedure to contain some residual beanie note.

Other variations or modifications, which will be obvious to those skilled in the art, are within the scope and teachings of this invention. This invention is not to be limited except as set forth in the following claims.

We claim:

1. A process for making an enhanced flavor fluid having improved flavor, comprising:

contacting a feed solution containing non-ethanol desirable flavor components and an undesirable component comprising ethanol with a surface of a hydrophobic membrane and contacting a pickup fluid with an opposing surface of said membrane, said pickup fluid containing less of said flavor components than said feed solution, and extracting desirable flavor components and not extracting a detrimental amount of ethanol from said feed solution into said pickup fluid to form said enhanced flavor fluid in said pickup fluid.

2. A process according to claim 1, wherein said enhanced flavor fluid is said pick-up fluid formed after extraction.

3. A process according to claim 1, wherein said hydrophobic membrane comprises a hydrophobic solid membrane or a hydrophobic liquid membrane having a microporous support.

4. A process according to claim 1, wherein the ratio of the concentration of said desirable flavor components in said feed solution to the concentration of said desirable flavor components in said pick-up fluid is greater than 1:1.

5. A process according to claim 1, wherein said pick-up fluid comprises a non-alcohol brew, a low-alcohol brew, water, carbonated water, ethylene glycol, polyethylene glycol, polypropylene glycol, polybutylene glycol, carbon dioxide or nitrogen.

* * * * *